US009842664B2

(12) United States Patent
Reilly et al.

(10) Patent No.: US 9,842,664 B2
(45) Date of Patent: Dec. 12, 2017

(54) RECOVERING AND RECYCLING URANIUM USED FOR PRODUCTION OF MOLYBDENUM-99

(71) Applicant: Los Alamos National Security, LLC, Los Alamos, NM (US)

(72) Inventors: Sean Douglas Reilly, Los Alamos, NM (US); Iain May, Los Alamos, NM (US); Roy Copping, Santa Fe, NM (US); Gregory Edward Dale, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 307 days.

(21) Appl. No.: 14/038,424

(22) Filed: Sep. 26, 2013

(65) Prior Publication Data
US 2015/0085963 A1    Mar. 26, 2015

(51) Int. Cl.
*G21G 1/02* (2006.01)
*G21G 1/04* (2006.01)
(Continued)

(52) U.S. Cl.
CPC .............. *G21G 1/04* (2013.01); *G21C 19/46* (2013.01); *G21G 2001/0036* (2013.01); *G21G 2001/0042* (2013.01); *Y02W 30/883* (2015.05)

(58) Field of Classification Search
CPC .............. G21G 2001/0036; G21G 2001/0047
See application file for complete search history.

(56) References Cited

U.S. PATENT DOCUMENTS

| 3,382,152 A | 5/1968 | Lieberman et al. |
| 3,468,808 A | 9/1969 | Arino |

(Continued)

FOREIGN PATENT DOCUMENTS

| WO | 0153205 | 7/2001 |
| WO | 2011081576 | 8/2011 |

(Continued)

OTHER PUBLICATIONS

IAEA-TECDOC-515 "Fission Molybdenum for Medical Use" Oct. 1987.*

(Continued)

*Primary Examiner* — Sean P Burke
(74) *Attorney, Agent, or Firm* — Lewis Roca Rothgerber Christie LLP

(57) ABSTRACT

A processes for recycling uranium that has been used for the production of molybdenum-99 involves irradiating a solution of uranium suitable for forming fission products including molybdenum-99, conditioning the irradiated solution to one suitable for inducing the formation of crystals of uranyl nitrate hydrates, then forming the crystals and a supernatant and then separating the crystals from the supernatant, thus using the crystals as a source of uranium for recycle. Molybdenum-99 is recovered from the supernatant using an adsorbent such as alumina. Another process involves irradiation of a solid target comprising uranium, forming an acidic solution from the irradiated target suitable for inducing the formation of crystals of uranyl nitrate hydrates, then forming the crystals and a supernatant and then separating the crystals from the supernatant, thus using the crystals as a source of uranium for recycle. Molybdenum-99 is recovered from the supernatant using an adsorbent such as alumina.

20 Claims, 1 Drawing Sheet

(51) Int. Cl.
G21C 19/46 (2006.01)
G21G 1/00 (2006.01)

(56) References Cited

U.S. PATENT DOCUMENTS

| | | | |
|---|---|---|---|
| 3,745,119 | A | 7/1973 | Arino |
| 3,799,883 | A | 3/1974 | Arino |
| 4,093,697 | A | 6/1978 | Hadi et al. |
| 4,094,953 | A | 6/1978 | Hadi et al. |
| 4,176,158 | A | 11/1979 | Laidler et al. |
| 4,284,472 | A | 8/1981 | Pomares et al. |
| 4,701,308 | A | 10/1987 | Koehly et al. |
| 5,112,581 | A | 5/1992 | Ohuchi et al. |
| 5,508,010 | A | 4/1996 | Sameh et al. |
| 5,596,611 | A * | 1/1997 | Ball .............................. 376/189 |
| 6,033,636 | A | 3/2000 | Todokoro et al. |
| 7,011,798 | B2 | 3/2006 | Yano et al. |
| 8,328,900 | B2 | 12/2012 | Bednarski et al. |
| 8,450,629 | B2 | 5/2013 | Pitcher |
| 2003/0133860 | A1* | 7/2003 | Yano et al. ........................ 423/3 |
| 2011/0206579 | A1 | 8/2011 | Glenn et al. |
| 2011/0250107 | A1 | 10/2011 | Vernedoe et al. |
| 2012/0300891 | A1 | 11/2012 | Piefer |
| 2014/0112858 | A1* | 4/2014 | Policke et al. ................. 423/253 |
| 2015/0085964 | A1 | 3/2015 | Reilly |

FOREIGN PATENT DOCUMENTS

| | | |
|---|---|---|
| WO | 2013010047 | 1/2013 |
| WO | 2013095108 | 6/2013 |

OTHER PUBLICATIONS

Bakel et al., "Thermoxid Sorbents for the separation and purification of 99Mo," a paper presented at RERTR, 26th International Meeting on Reduced Enrichment for Research and Test Reactors, Nov. 7-12, 2004, Vienna, Austria.
Cheng et al., "Study on the separation of Molybdenum-99 and Recycling of Uranium to Water Boiling Reactor," Appl. Radiat. Isot., vol. 40, pp. 315-324, 1989.
Chikazawa et al, "Batch crystallization of Uranyl Nitrate," J. Nucl. Sc. & Tech., vol. 45, pp. 582-587, 2008.
Cordfunke, "The system uranyl-sulphate-water-1 Preparation and characterization of the phases in the system," J. Inorg. Nucl. 31, pp. 1327-1335, 1969.
Dadachova et al., "Improved processes for molybdenum-99 production," J. Radioanal. Nucl. Chem, vol. 240, pp. 935-938, 1999.
Homma et al., "Flowsheet study of U-Pu Co-Crystallization Reprocessing System," J. Nucl. Sci. & Tech., 2008, vol. 45, pp. 510-517.
Hwang et al., "Separation of 99Mo from a simulated fission product solution by precipitation with α-benzoinoxime," J. Radioanal. Nucl. Chem., Nov. 2002, vol. 254, pp. 255-262.
McDonald et al., "Challenges of extracting and purifying fission produced Molybdenum99", Ind. Eng. Chem. Res., 2000, vol. 39, pp. 3146-3150.
Munze et al., "Large scale production of fission 99Mo by using elements of a research reactor as starting material," Int. J. Rad. App. Inst. Part A Appl. Rad. Isotopes, 1984, vol. 35, pp. 749-754.
Mullins et al., "Crystallization of uranium complexes for partitioning of spent nuclear fuel," in Eds. Lumetta, G.J. Nash, K.L., Clark, S.B. and Friese, J.I. "Separations in Nuclear Fuel Cycle in the 21st Century." (2006) ACS Symposium Series 933:183-200.
Nakahara et al., "Precipitation behavior of dicesium tetravalent plutonium hexanitrate in cooling crystallization of uranyl nitrate hexahydrate," Nuclear Technology, Feb. 2011, vol. 173, pp. 183-190.

Nakahara et al., "Purification rate of uranyl nitrate hexahydrate crystal for transuranium elements on isothermal sweating phenomenon," Ind. Eng. Chem., 2010, vol. 49, pp. 11661-11666, published on web Sep. 17, 2010.
Nakahara et al., "Enhancement of decontamination performance of impurities for uranyl nitrate hexahydrate crystalline particles by crystal purification operation," Nuclear Technology, Apr. 2011, vol. 174, pp. 77-84.
Nakahara et al., "Behavior of actinide elements and fission products in recovery of uranyl hexahydrate crystal by cooling crystallization method," Nuclear Technology, Apr. 2011, vol. 174, pp. 109-118.
Nakahara et al., "Removal of liquid and solid impurities from uranyl nitrate hexahydrate crystalline particles in crystal purification process," J. Nucl. Sci. & Tech., Mar. 2011, vol. 48, pp. 322-329.
Nakahara et al., "Effect of crystal size on purity of uranyl nitrate hexahydrate crystalline particles grown in nitric acid medium," Radiochim. Acta, 2012, vol. 100, pp. 821-826, published online Aug. 13, 2012.
Service, et al., "Scrambling to close the isotope gap," Science, 2010, vol. 331, pp. 277-279.
Vandergrift et al., "GTRI progress in technology development for conversion of 99Mo production to low enriched uranium," Paper presented at RERTR 2011—33rd International Meeting on Reduced Enrichment for Research and Test Reactors, Oct. 23-27, 2011, Santiago, Chile.
Van Der Walt et al., "The isolation of 99Mo from fission material for use in the 99Mo/99mTc generator for medical use," Radiochim. Acta, Apr. 2004, vol. 92, pp. 251-257.
Washiya et al., "Continuous-operation test at engineering scale uranium crystallizer system," Journal of Power and Energy Systems, vol. 4, No. 1, Mar. 18, 2010.
Wilkerson et al., "Study of Alumina use as a separation step in Mo-99 producjtion", (2002), Paper presented at RERTR, 24th International Meeting on Reduced Enrichment for Research and Test Reactors Nov. 3-8, Barilo-che, Argentina.
Yano et al., "Uranium crystallization test with dissolver solution of irradiated fuel," J. Nucl. Sci. & Tech., 2007, vol. 44, pp. 344-348.
IAEA-TecDoc-515, Fission Molybdenum for Medical Use, Proceedings of a Technical Committee Meeting organized by the International Atomic Energy Agency and held in Karlsruhe, Oct. 13-16, 1987.
IAEA-TecDoc-1051, Management of Radioactive Waste from 99Mo Production, International Atomic Energy Agency, printed by the IAEA in Austria, Nov. 1998.
IAEA-TecDoc-1601, Homogenous Aqueous Solution Nuclear Reactors for the Production of Mo-99 and other Short Lived Radioistotopes, International Atomic Energy Agency, printed by the IAEA in Austria, Sep. 2008.
Stepinski et al., "Design of Column Separation of Processes for Recovery of Molybdenum from Dissolved High Density LEU Target," Atomic Energy website, http://www.iaea.org/OurWork/ST/NE/NEFW/Technical-Areas/RRS/documents/mo99/STEPINSKIcolumnsepmo99.pdf. Argonne National Laboratory, Argonne, IL 2008.
U.S. Appl. No. 14/042,115 Office Action dated Jul. 31, 2015.
Seidell, Atherton, *Solubilities of Inorganic and Organic Compounds*, 2ed, 1919, Stanbope Press, Boston, MA, pp. 734 and 736.
"Sulfuric Acid | H2SO4—PubChem", *Pubchem Open Chemistry Database*, accessed at https://pubchem.ncbi.nlm.nih.gov/compound/sulfuric_acid#section=Vapor-Density&fullscreen=true on Apr. 27, 2017.
"Nitric Acid | HNO3—PubChem", *Pubchem Open Chemistry Database*, accessed at https://pubchem.ncbi.nlm.nih.gov/compound/944#section=Vapor-Pressure&fullscreen=true on Apr. 27, 2017.

* cited by examiner

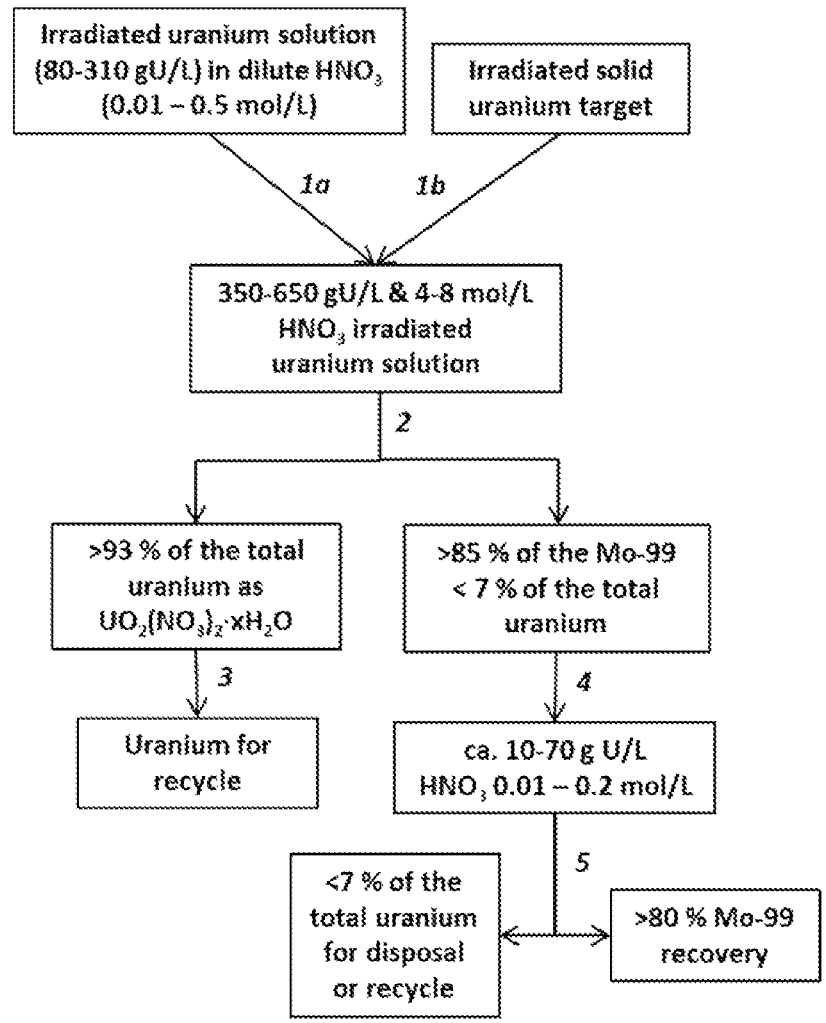

RECOVERING AND RECYCLING URANIUM USED FOR PRODUCTION OF MOLYBDENUM-99

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to the production of molybdenum-99 and to recycling uranium after it has been used for production of molybdenum-99.

BACKGROUND OF THE INVENTION

Technetium-99m ("Tc-99m") is the most commonly used radioisotope in nuclear medicine. Tc-99m is used in approximately two-thirds of all imaging procedures performed in the United States. Tens of millions of diagnostic procedures using Tc-99m are undertaken annually. Tc-99m is a daughter isotope produced from the radioactive decay of molybdenum-99 ("Mo-99"). Mo-99 decays to Tc-99m with a half life of 66 hours.

The vast majority of Mo-99 used in nuclear medicine in the U.S. is produced in aging foreign reactors. Many of these reactors still use solid highly enriched uranium ("HEU") targets to produce the Mo-99. HEU has a concentration of uranium-235 ("U-235") of greater than 20%. Maintenance and repair shutdowns of these reactors have disrupted the supply of Mo-99 to the U.S. and to most of the rest of the world. The relatively short half-life of the parent radioisotope Mo-99 prohibits the build-up of reserves. One of the major producers, The National Research Reactor in Canada, will cease production in 2016.

An alternative strategy for providing Mo-99 is based upon the use of low enriched uranium (LEU), which presents a much lower nuclear proliferation risk than HEU. LEU has a concentration of U-235 of less than 20%, and many international Mo-99 producers are converting from HEU to LEU solid targets for Mo-99 production.

Several of the technologies currently being considered for the domestic supply of Mo-99 are based on the fission of U-235 in mildly acidic solutions of LEU, including the Aqueous Homogenous Reactor concept and an Accelerator-based concept which provides an external source of neutrons. Only a small fraction of the U-235 present in the acidic solution will undergo fission, as is also the case with solid target irradiation. Fission of U-235 generates a variety of fission products, one of which is Mo-99. The uranium in the mildly acidic solution is in the +VI oxidation state and in the chemical form of the uranyl di-oxo di-cation ($UO_2^{2+}$).

Some form of enriched uranium (HEU and/or LEU) is used for the production of Mo-99. After the fission process, the remaining uranium is typically discarded along with other fission products as waste. Recycling the uranium for additional production of Mo-99 would minimize the waste while maximizing the utilization of the uranium.

Therefore, an object of the present invention is to provide a process for recycling uranium after it has been used for the production of Mo-99.

Another object is to provide a process for producing Mo-99 using recycled uranium.

BRIEF DESCRIPTION OF THE DRAWINGS

FIG. 1 provides a flow diagram of an embodiment process for producing Mo-99 using uranium and for recycling the uranium for the continued production of Mo-99.

SUMMARY OF THE INVENTION

The embodiments for recovering uranium apply to recovering all isotopic ratios of uranium, including low-enriched uranium (LEU) as well as highly-enriched uranium (HEU). Enriched uranium refers to uranium enriched in isotope U-235.

A process for recycling irradiated uranium that has been used for the production of Mo-99 involves providing an aqueous solution comprising uranyl nitrate and nitric acid. The uranyl nitrate comprises uranium, and inducing fission of U-235 in the uranium produces soluble fission products, with the soluble fission products including Mo-99. Thereafter, conditioning the solution promotes the formation of crystals that comprise uranyl nitrate hydrates, and a supernatant that comprises the soluble fission products which includes Mo-99. The crystals will then be separated from the supernatant.

In an embodiment, a second aqueous solution is prepared from the crystals. The second aqueous solution comprises uranyl nitrate and nitric acid. After conditioning the second aqueous solution to a suitable acidity and uranium concentration, it is irradiated, inducing fission of U-235 in the uranium that produces soluble fission products, with the soluble fission products including Mo-99. Thereafter, conditioning this second solution promotes a second crystallization, forming crystals that comprise uranyl nitrate hydrates, and forming a supernatant that comprises the soluble fission products which includes Mo-99. The crystals from the second crystallization will then be separated from the second supernatant.

In yet another embodiment, a third aqueous solution is prepared from the crystals from the second crystallization. The third aqueous solution comprises uranyl nitrate and nitric acid. After conditioning the third aqueous solution to a suitable acidity and uranium concentration, it is irradiated, inducing fission of U-235 in the uranium that produces soluble fission products, with the soluble fission products including Mo-99. Thereafter, conditioning this second solution promotes a second crystallization, forming crystals that comprise uranyl nitrate hydrates, and forming a supernatant that comprises the soluble fission products which includes Mo-99. The crystals from the third crystallization will then be separated from the third supernatant.

Thus, embodiment processes for the recycle of uranium can be repeated multiple times for the production of multiple batches of Mo-99 from the same repeatedly-recycled uranium. After each recycle, a small fraction of less than 10 percent of the original uranium content will be lost during processing. This loss can be made up using a fresh LEU uranyl nitrate aqueous solution and nitric acid and/or recovered uranium from the supernatant solution, after recovery of the Mo-99 by applying the crystallization process.

Another embodiment process for the recycle of uranium involves providing an irradiated solid target comprising uranium, irradiating the target to produce fission products comprising Mo-99, and thereafter forming an aqueous acidic solution comprising uranium from the target. The nitric acid and uranium concentrations can be adjusted to concentrations suitable for inducing the formation of crystals of uranyl nitrate hydrates and a supernatant. The crystals can then be separated from the supernatant, thereby recovering uranium that has been used for the production of Mo-99.

DETAILED DESCRIPTION

An embodiment process relates to recovery of uranium that has been used for the production of Mo-99 generated from the fission of U-235. Mo-99 undergoes radioactive decay to Tc-99m, the most widely used radioisotope in nuclear medicine. Recovery of the uranium allows for continued use of the parent radioisotope (U-235) to produce Mo-99, which can decay to generate Tc-99m. Recovery of uranium also minimizes waste by allowing for continued use of the same uranium for the continued production of Mo-99.

An embodiment process for recycling uranium that has been used for the production of Mo-99 includes providing an aqueous solution comprising uranyl nitrate and nitric acid, irradiating the solution to produce soluble fission products that include Mo-99. Thereafter adjusting the nitric acid and uranium concentration to concentrations suitable for inducing the formation of crystals of uranyl nitrate hydrates, and a supernatant (i.e., the liquid phase that remains). The crystals may be separated from the supernatant and recycled for the production of additional Mo-99.

It should be understood that uranium includes both LEU (uranium having less than 20% of the U-235 isotope), and also HEU (uranium having greater than 20% of the U-235 isotope). Thus, an embodiment of the disclosed process may be used for recovery of either LEU or HEU.

In an embodiment, recovery of uranium involves crystallization of uranium compounds from a previously irradiated solution of uranium having a concentration of uranium in a range of from 80 gU/L to 310 gU/L (gU/L means grams of uranium per liter of solution). An embodiment process involves irradiation of a solution that includes uranium in the form of soluble uranyl nitrate in a dilute nitric acid solution. The dilute nitric acid solution has a solution acidity of from about 0.01 M to about 0.5 M (moles/liter). One of the fission products is a soluble species of Mo-99. Some non-limiting species include soluble species that comprise molybdenum in the +VI oxidation state. Examples include $H_2MoO_4$, $HMoO_4^-$ and/or $MoO_4^{2-}$. After the irradiation, the resulting solution is evaporated under vacuum and/or through heating, and afterward is acidified with a suitable amount of nitric acid to yield a solution concentration of nitric acid of from about 4M to about 8M, and a uranium concentration of from about 350 gU/L to about 650 gU/L; the temperature of this solution may be raised to ensure that all the uranium remains in solution. This solution is then evaporated under reduced pressure and/or cooled in order to promote conditions suitable for the formation of crystals of uranyl nitrate hydrates from the solution. An example of such a uranyl nitrate hydrate is $UO_2(NO_3)_2.6H_2O$. The crystals are then separated from the supernatant that remains and can be washed with nitric acid.

Nitric acid can be removed from the supernatant by evaporation under reduced pressure and/or by heating. Water, and nitric acid if needed, can be added to yield a concentration of nitric acid of from about 0.01 to about 0.2 M and a uranium concentration of from about 10 gU/L to about 70 gU/L. Removal of excess nitric acid from the supernatant facilitates recovery of Mo-99 using a column of adsorbent such as alumina.

Recovery of the crystalline uranyl nitrate hydrates provides a means for recovery of uranium for recycle for additional irradiation to promote fission of U-235 to generate additional Mo-99. For recycling, the crystals will be dissolved in water to form a solution, and the solution will be conditioned by evaporation under reduced pressure and/or heating. The solution conditioning process removes nitric acid. The addition of water, and nitric acid if needed, will then result in a solution with a uranium concentration of between about 80 gU/L to 310 gU/L and solution acidity of between about 0.01 to 0.5 M.

Only a small fraction of the U-235 component of the uranium undergoes fission during irradiation. Therefore, recycling of uranium according to the present process minimizes the generation of hazardous waste while enabling reuse of uranium for generating Mo-99.

Nitric acid that is used in the process may be recovered using an evaporator. Thus, nitric acid can also be recycled, further minimizing hazardous waste.

An embodiment process will allow (1) recycle of uranium and (2) efficient Mo-99 recovery after purification through an alumina column. Alumina is used routinely for purification of Mo-99, and for the delivery of Tc-99m from medical isotope generators. Thus, an embodiment process for recycling uranium that has been used for the production of Mo-99 involves providing an aqueous solution comprising uranyl nitrate and nitric acid, irradiating the solution to produce soluble fission products, the soluble fission products comprising Mo-99. Thereafter, the solution will be conditioned to recover uranium by crystallization. The crystals will comprise uranyl nitrate hydrates and a supernatant that will comprise the soluble fission products. The soluble fission products will include Mo-99, Ba-140, Zr-95, Ru-103 and Ce-141. Afterward, the process continues by preparing a second aqueous solution from the crystals, the second aqueous solution comprising uranyl nitrate and nitric acid. This second solution would be irradiated to produce soluble fission products comprising Mo-99, Ba-140, Zr-95, Ru-103 and Ce-141. Thereafter, this second solution will be conditioned to again recover uranium by crystallization.

The process can be repeated again and again but unwanted activation and fission products could build up in the crystallized uranium nitrate hydrates. To prevent, or at least minimize, the buildup of unwanted activation and fission products, the recycled uranium may be periodically purified. Purification can be accomplished by a number methods including washing the crystals with nitric acid, heating the crystals to sweat out impurities prior to washing and/or undertaking a second recrystallization process. In the latter case the uranyl nitrate hydrates solid would be dissolved in nitric acid, and the resulting solution would be conditioned to yield a 350-650 gU/L solution in a nitric acid concentration of between 4-8 M prior to crystallization through concentration by evaporation under reduced pressure and/or by cooling. After purification, the crystalline uranyl nitrate hydrates could be dissolved in water, and then nitric acid would be removed by heating and/or by evaporating under reduced pressure. Water, and nitric acid if needed, can then be added to generate a 80-310 gU/L solution with a nitric acid concentration of between 0.01-0.5 mol/L that can be irradiated, thus recycling the uranium.

After the solution irradiation, and uranium nitrate hydrates crystallization, the Mo-99 remains soluble in the supernatant. Mo-99 can be recovered from the supernatant using a column based process employing alumina as a sorbent after the supernatant has been conditioned to yield a concentration of nitric acid of from about 0.01 to about 0.2 M and a uranium concentration of from about 10 gU/L to about 70 gU/L. Uranium at lower concentrations (e.g., below 70 gU/L) results in comparatively low nitrate concentrations. Nitrate will bind to alumina, but at lower nitrate concentrations nitrate will not effectively compete with molybdenum in the +VI oxidation state. Molybdenum in the +VI oxidation state binds strongly to the alumina in mildly acidic aqueous solution, and can be stripped from alumina in basic solution. Additional purification steps will then result in a pure Mo-99 product for use in Tc-99m generators.

80% or greater of the Mo-99 produced from the U-235 fission in dilute nitric acid may be recovered after a column-based alumina separation, with the percentage yield not corrected for radioactive decay. 93% or greater of the uranium may be recycled for future production of Mo-99.

In an embodiment, a uranium nitrate solution may be concentrated through evaporation and acidified to a concentration of nitric acid of between 4 M and 8 M and uranium in an amount of, for example, 500 gU/L. Cooling to a temperature effective for crystallization, forming crystals of uranyl nitrate hydrates, an effective temperature being a temperature of from about 10° C. to about −30° C. (e.g. −10° C.) allows crystallization of 93% or greater of the uranium as uranyl nitrate hydrates, which is a largely insoluble salt at such cold temperatures. Evaporation under reduced pressure may be used as a means of both cooling the solution and lowering solution volume to increase the percentage of uranyl nitrate hydrates crystallized from solution. The crystals of uranyl nitrate hydrates are filtered from the supernatant that remains. The supernatant may be further conditioned to lower the nitric acid concentration through evaporation under reduced pressure and/or heating.

An inorganic oxidant may be added either to the pre-crystallization solution and/or the post-crystallization supernatant to ensure all of the Mo-99 is in the +VI oxidation state. This is the preferred oxidation state for separation of Mo-99 from the uranium nitrate hydrates in the crystallization step and for using alumina as an absorbent. Suitable inorganic oxidants include potassium permanganate, hydrogen peroxide, and sodium persulfate.

Another embodiment relates to a process for recycling uranium wherein irradiation of solid targets leads to the production of Mo-99 from U-235. Solid uranium targets can be based on several chemical compositions, including uranium metal foils, $U_3Si_2$ plates, $UAl_x$ targets and $UO_2$ targets. Through dissolution and subsequent chemical processing of the irradiated solid targets a uranium solution of nitric acid concentration of between 4 M and 8 M, and a uranium concentration of between 350 gU/L and 650 gU/L, can be prepared. Crystallization of this solution recovers 93% or greater of the uranium as uranyl nitrate hydrates for subsequent recycle.

FIG. 1 provides a flow diagram for an embodiment process. The boxes refer to a particular material and the numbers 1 through 5, which are in between boxes, refer to process steps. Thus, the top left box refers to an irradiated solution of enriched uranium having uranium concentration of from about 80 gU/L to about 310 gU/L in a dilute nitric acid solution having a concentration of from about 0.01 M to about 0.5 M. The number 1a refers to the process steps performed on the composition, which are steps that result in increasing the concentration of uranium nitrate to a concentration of from about 350 gU/L to about 650 gU/L and increasing the concentration of nitric acid to a concentration of from about 4 M to about 8 M. These results may be achieved by evaporation using heat and/or evaporation under a reduced pressure, and addition of nitric acid. This solution may be held at above ambient temperature (e.g., 40° C.) to be sure all of the uranium remains in solution. Alternatively, the top right box refers to an irradiated solid uranium target. The number 1b refers to the process steps performed on the composition, which are steps that result in dissolution and chemical processing to generate a solution with concentration of from about 350 gU/L to about 650 gU/L, and increasing the concentration of nitric acid to a concentration of from about 4 M to about 8 M. This solution may be held at above ambient temperature (e.g., 40° C.) to be sure all of the uranium remains in solution. Process step 2, which is performed on the 350 gU/L to about 650 gU/L solution, results in the formation of crystals of uranyl nitrate hydrates and a supernatant. The uranyl nitrate hydrates contain greater than 93% of the uranium. At this point the uranyl nitrate hydrates could be conditioned and converted back into a solid target for irradiation and production of Mo-99. The supernatant contains greater than 85% of the Mo-99 (not corrected for radioactive decay) and less than 7% of uranium. Process step 3, which is performed on the uranyl nitrate hydrate crystals $(UO_2(NO_3)_2 \cdot xH_2O)$, involves dissolving the crystals in water, and subsequent evaporation using heat and/or reduced pressure to remove nitric acid. Then water will be added, and nitric acid if needed, to arrive at a dilute nitric acid solution (from about 0.01 to about 0.5 M) with a uranium concentration (350 gU/L to about 650 gU/L) suitable for recycling the uranium so that it can be used for another round of irradiation, solution conditioning, etc. Process step 4 is performed on the supernatant which contains greater than 85% of the Mo-99 (not corrected for radioactive decay) and less than 7% of the uranium. Process step 4 involves evaporation using heat and/or reduced pressure to remove nitric acid. Then water will be added, and nitric acid if required, to obtain a concentration of uranium of from about 10 gU/L to about 70 gU/L and a solution nitric acid concentration from about 0.01 M to about 0.2 M. Process step 5 is performed next, which involves using a column of alumina adsorbent to recover more than 80% of the total Mo-99 (not corrected for radioactive decay), and the uranium from this step (<7%) can be disposed of or subjected to recycle through concentration of uranium to a concentration of from about 350 gU/L to about 650 gU/L and increasing the concentration of nitric acid to a concentration of from about 4 M to about 8 M, and subsequently undertaking steps 2 and 3.

The aforementioned embodiments relate to the irradiation of solutions and solid targets of uranium and subsequent recovery of molybdenum-99 for generating Tc-99m, and thus relates to satisfying an objective of using LEU for generating molybdenum-99 and subsequent recycling of the LEU.

Although the present invention has been described with reference to specific details, it is not intended that such details should be regarded as limitations upon the scope of the invention, except as and to the extent that they are included in the accompanying claims.

What is claimed is:
1. A process for recycling uranium that has been used for the production of molybdenum-99 (Mo-99), comprising:
 providing an aqueous solution comprising a first nitric acid concentration and a first uranium concentration;
 irradiating the aqueous solution to produce soluble fission products comprising Mo-99;
 adjusting the first uranium concentration to a second uranium concentration suitable for formation of uranyl nitrate hydrate crystals;
 adding an inorganic oxidant to the aqueous solution to ensure that the Mo-99 is in a +VI oxidation state;
 inducing the formation of uranyl nitrate hydrate crystals and a supernatant; and separating the uranyl nitrate hydrate crystals from the supernatant.

2. The process of claim 1, wherein the uranium is low enriched uranium.

3. The process of claim 1, wherein the inducing the formation of uranyl nitrate hydrate crystals comprises cooling the aqueous solution to a temperature effective for the formation of the uranyl nitrate hydrate crystals.

4. The process of claim 1, wherein the inducing formation of uranyl nitrate hydrate crystals comprises evaporating the aqueous solution under reduced pressure.

5. The process of claim 1, further comprising separating the Mo-99 from the supernatant after separating the uranyl nitrate hydrate crystals from the supernatant.

6. The process of claim 1, further comprising purifying the uranyl nitrate hydrate crystals after separating the uranyl nitrate hydrate crystals from the supernatant.

7. A process for recycling uranium that has been used for the production of Mo-99, comprising:
providing an aqueous solution comprising a nitric acid concentration of about 0.01 M to about 0.5 M, and a uranium concentration of about 80 to 310 gU/L;
irradiating the aqueous solution to produce soluble fission products comprising Mo-99;
adjusting the nitric acid concentration to about 4 M to about 8 M and the uranium concentration to about 350 to 650 gU/L;
adding an inorganic oxidant to the aqueous solution to ensure that the Mo-99 is in a +VI oxidation state;
inducing formation of uranyl nitrate hydrate crystals and a supernatant; and
separating the uranyl nitrate hydrate crystals from the supernatant, the supernatant comprising the soluble fission products.

8. The process of claim 7, wherein the uranium is low enriched uranium.

9. The process of claim 7, wherein the inducing the formation of uranyl nitrate hydrate crystals comprises cooling the aqueous solution to a temperature effective for the formation of the uranyl nitrate hydrate crystals.

10. The process of claim 7, wherein the inducing formation of uranyl nitrate hydrate crystals comprises evaporating the aqueous solution under reduced pressure.

11. The process of claim 7, further comprising separating the Mo-99 from the supernatant after separating the uranyl nitrate hydrate crystals from the supernatant.

12. The process of claim 7, further comprising purifying the uranyl nitrate hydrate crystals after separating the uranyl nitrate hydrate crystals from the supernatant.

13. The process of claim 7, further comprising:
preparing a second aqueous solution from the uranyl nitrate hydrate crystals, the second aqueous solution comprising a second nitric acid concentration of about 0.01 M to about 0.5 M, and a second uranium concentration of about 80 to 310 gU/L;
irradiating the second aqueous solution to produce soluble fission products comprising Mo-99;
adjusting the second nitric acid concentration to about 4 M to about 8 M, and the second uranium concentration to about 350 to 650 gU/L;
inducing formation of a second batch of uranyl nitrate hydrate crystals and a second supernatant from the second aqueous solution, the second supernatant comprising soluble fission products comprising Mo-99; and
separating the second batch of uranyl nitrate hydrate crystals from the second supernatant.

14. The process of claim 13, further comprising separating Mo-99 from the second supernatant.

15. A process for recycling uranium that has been used for the production of Mo-99, comprising:
irradiating a solid target comprising uranium to produce fission products comprising Mo-99;
forming an aqueous acidic solution from the solid target, the aqueous acidic solution comprising a uranium concentration and a nitric acid concentration;
adjusting the nitric acid concentration to about 4 M to about 8 M, and the uranium concentration to about 350 to 650 gU/L;
inducing formation of uranyl nitrate hydrate crystals and a supernatant;
adding an inorganic oxidant to the supernatant to ensure that the Mo-99 is in a +VI oxidation state; and
separating the uranyl nitrate hydrate crystals from the supernatant.

16. The process of claim 15, wherein the uranium is low enriched uranium.

17. The process of claim 15, wherein the inducing formation of uranyl nitrate hydrate crystals comprises cooling the aqueous acidic solution to a temperature effective for formation of the uranyl nitrate hydrate crystals.

18. The process of claim 15, wherein the inducing formation of uranyl nitrate hydrate crystals comprises evaporating the aqueous acidic solution under reduced pressure.

19. The process of claim 15, further comprising separating Mo-99 from the supernatant after separating the uranyl nitrate hydrate crystals from the supernatant.

20. The process of claim 15, further comprising purifying the uranyl nitrate hydrate crystals after separating the uranyl nitrate hydrate crystals from the supernatant.

* * * * *